United States Patent [19]

Kuwabara

[11] 4,354,800
[45] Oct. 19, 1982

[54] METHOD OF CONTROLLING PUMP TURBINE

[75] Inventor: Takao Kuwabara, Hitachi, Japan

[73] Assignee: Hitachi, Ltd., Tokyo, Japan

[21] Appl. No.: 187,848

[22] PCT Filed: Apr. 5, 1979

[86] PCT No.: PCT/JP79/00084
§ 371 Date: Dec. 4, 1979
§ 102(e) Date: Dec. 4, 1979

[87] PCT Pub. No.: WO79/00928
PCT Pub. Date: Nov. 15, 1979

[30] Foreign Application Priority Data

Apr. 13, 1978 [JP] Japan .................................. 53/44654

[51] Int. Cl.³ .............................................. F03B 15/08
[52] U.S. Cl. .............................................. 415/1; 415/36
[58] Field of Search ............................... 415/1, 36, 45

[56] References Cited

U.S. PATENT DOCUMENTS

3,403,888 10/1968 Hartland .................................. 415/1
4,201,925 5/1980 Kuwahara et al. ...................... 415/1

Primary Examiner—Louis J. Casaregola
Attorney, Agent, or Firm—Antonelli, Terry & Wands

[57] ABSTRACT

A method of controlling a pump-turbine having an S-section in its characteristic curve. The behavior of the operation point tracing up the S-section is judged and discriminated through detection of the rotation speed N of the pump-turbine or the acceleration dN/dt of the same. More specifically, it is judged that the operation point of the pump-turbine is tracing the S-section in the flow-rate reducing direction, through detections of the conditions that the acceleration dN/dt is materially negative and that the rotation speed N is greater than a predetermined speed. At the same time, it is judged that the operation point has commenced to trace the S-section in the flow-rate increasing direction, through detecting that the rotation speed has come down below the predetermined speed.

14 Claims, 11 Drawing Figures

METHOD OF CONTROLLING PUMP TURBINE

BACKGROUND OF THE INVENTION

Field of the Invention

The present invention relates to a pump turbine and, more particularly, to a method of controlling a high head pump turbine which inevitably exhibits S-characteristic in the turbine operation area.

List of Prior Art References

The following references are cited to show the state of the art:
1. U.S. Pat. No. 3,452,962, Richard B. Will, patented July 1, 1969
2. Japanese Pat. No. 40902/74, Motoyasu Morita, Published Nov. 6, 1974
3. Japanese Laid-Open Pat. No. 101646/76, Yoshiyuki Niikura, Laid Open, Sept. 8, 1976

List of Prior Application References

The following reference is cited to show the prior application which has been already filled by the present applicant:
1. U.S. patent application Ser. No. 908,202, Takao Kuwabara & Hiroshi Okumura, filed May 22, 1978

Description of the Prior Art

Generally, components of a pump turbine such as a runner, particularly of a high head type, are designed to achieve sufficient centrifugal pump action so as to provide a high discharge head during its pumping operation. This design, however, adversely affects the turbine operation of the pump turbine. The performance of the pump turbine designed in this manner can be shown by a performance curve representing the relationship between speed per unit head ($N_1$) and discharge per unit head ($Q_1$) under a predetermined opening of wicket gates. This curve envolves, in the turbine operation area, a first section where the value of $Q_1$ reduces with the increase of the value of $N_1$ and a second section where the value of $Q_1$ reduces with the decrease of the value of $N_1$. For convenience of explanation, the second section will be referred in this specification to as "S-section". Further, the pump-turbine performance in the S-section will be hereinafter referred to as "S-characteristic". During the turbine operation in the S-section, the value of torque per unit head ($T_1$) also is reduced as the value of speed per unit head ($N_1$) decreases.

Ordinarily, the turbine operation of the pump-turbine is effected in the abovementioned first section. However, in the case where the speed per unit head ($N_1$) is suddenly increased because of, for example, a removal or loss of load carried on the pump-turbine, the pump-turbine operation is shifted to the S-section. As the pump-turbine starts to operate in the S-section, the discharge per unit head ($Q_1$) and speed per unit head ($N_1$) are first reduced tracing the characteristic curve of the S-section from one end to the other, and thereafter $Q_1$ and $N_1$ are increased tracing the same curve in the opposite direction in the same manner as the swing back of a pendulum. This reciprocal tracing on the S-region is repeated almost endlessly, as long as the wicket gates are kept opened beyond the predetermined opening and would never be terminated unless a suitable measure is taken. Also the torque per unit head ($T_1$) is repeatedly reduced and increased during this pump-turbine operation. The pump-turbine operation in the S-section is preferably avoided or minimized, since this operation causes in the upstream penstock and the downstream draft tube, as well as in the pump-turbine, an abnormal hydraulic pressure variation incurring a large pressure rise and drop with the resultant severe water hammer and, in some cases, water column separation.

The abovementioned removal of load takes place, when, for example, a generator which is being driven by the pump-turbine loses its load due to an opening of the circuit breaker or failure or burn-out of the transformer. The water hammer is heavy particularly when the either one or both of the penstock and the draft tube are long.

Figure 1A:
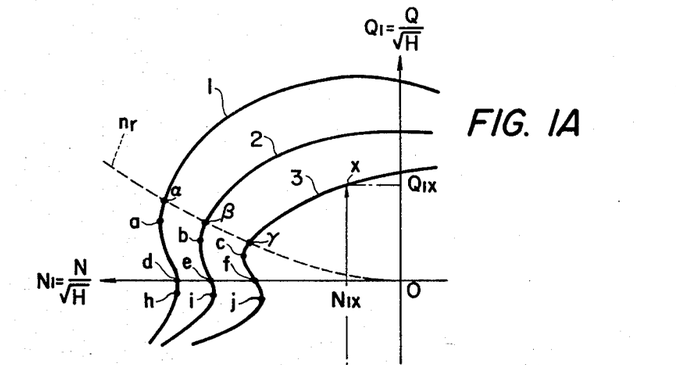
FIGS. 1A and 1B are illustrations of S-characteristic peculiar to pump-turbines.
Figure 1B:
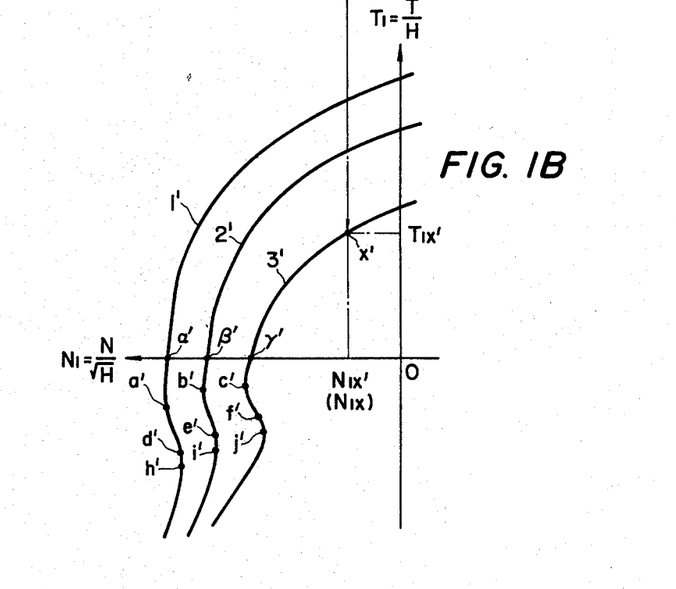

The characteristic of a pump-turbine exhibiting S-characteristic in the turbine operation area is illustrated in FIGS. 1A and 1B. More specifically, FIG. 1A illustrates the pump-turbine performance as the relationship between speed per unit head ($N_1$) and discharge per unit head ($Q_1$) with a parameter of wicket gate opening, while FIG. 1B illustrates the performance as the relationship between the speed per unit head ($N_1$) and torque per unit head ($T_1$) making use of the same parameter. $N_1$, $Q_1$ and $T_1$ are given by the following equations:

$$N_1 = N/\sqrt{H}, \quad Q_1 = Q/\sqrt{H}, \quad \text{and} \quad T_1 = T/H$$

In these equations, characters N, Q, H and T designate rotation speed of the pump-turbine, flow rate through the pump-turbine, pump turbine effective head and the pump turbine torque, respectively.

Performance curves 1 and 1' are obtained with a predetermined comparatively large opening of wicket gates, and performance curves 2 and 2' are obtained with smaller opening of wicket gates. Further, performance curves 3 and 3' represent the pump-turbine performance obtained with further reduced wicket gate opening. On the section a-d-h of the performance curve 1, the value of $Q_1$, is reduced with the decrease of the value of $N_1$. As stated above, this curve section a-d-h is referred in this specification to as "S-section". Similarly, the curve sections b-e-i and c-f-j also are S-sections of the performance curves 2 and 3, respectively. It will be seen that the S-section a-d-h of the performance curve 1 is larger in length than the S-section b-e-i of the performance curve 2, and that the S-section b-e-i of the performance curve 2 has a larger length than the S-section c-f-j of the performance curve 3. This means that the length of the S-section is reduced when the opening of the wicket gates is reduced.

Also in FIG. 1B, as in FIG. 1A, the curve sections a'-d'-h', b'-e'-i' and c'-f'-j' are S-sections of the performance curves 1', 2' and 3', respectively.

FIG. 1B has close relation to FIG. 1A. For example, the point x on the curve 3 in FIG. 1A, which satisfies the equations $Q_1 = Q_{1x}$ and $N_1 = N_{1x}$, corresponds to the point x' on the curve 3' in FIG. 1B. The point x' satisfies the equations $T_1 = T_{1x}$, and $N_1 = N_{1x}'$ ($=N_{1x}$). Similarly the points a, b, c, d, e, f, g, h, i and j in FIG. 1A correspond to the points a', b', c', d', e', f', g', h', i', and j' in FIG. 1B, respectively.

The curve $n_r$ is the no load discharge line. The points $\alpha$, $\gamma$ and $\gamma$, which are the intersections of the curves 1, 2, 3 and the curve $n_r$, correspond to the points $\alpha'$, $\beta'$ and $\gamma'$, which are the intersections of the curves 1', 2', 3' and the line $T_1=0$.

Hereinafter, the turbine operation, i.e. the electric power generating operation of the pump turbine will be described with reference to the performance curves 1 and 1′.

As stated before, the characteristic corresponding to the curves 1 and 1′ is obtained by selecting a comparatively large opening of the wicket gates. Ordinarily, the turbine operation of the pump-turbine is effected on the upper curve section of the performance curve 1, i.e., on the curve section above the S-section a-d-h in $Q_1$ axis or $T_1$ axis. However, if, for example, the load imposed on the pump-turbine is suddenly removed, the value of $N_1$ is suddenly increased drastically because of the sudden increase of the pump-turbine rotation (N). Thus, the pump-turbine operation is shifted to the S-section. During the operation in the S-section, when the value of $N_1$ is reduced due to the decrease of the pump-turbine rotation (N), the value of $Q_1$ also is reduced. The reduction of the value of $Q_1$ means that the flow rate (Q) through the pump-turbine is correspondingly reduced, provided that the value of pump-turbine effective head H is constant. Actually, the value of H, which is represented by the difference in head between the inlet side of the pump-turbine connected to a penstock and the outlet side thereof connected to a draft tube, is increased as the flow rate Q reduces. Thus, once the value of $N_1$ is reduced, and the reduction of the flow rate Q causes the increase of pump-turbine effective head H. This increase in the effective head H further decreases the value of $N_1$, which in turn causes further decrease of $Q_1$. Thus, once the operation in the S-section is commenced, $Q_1$ and $N_1$ are acceleratingly and continuously reduced tracing the S-section in the $Q_1$-reducing direction, i.e., from the point a to point h. It will be understood that $Q_1$ and $N_1$ are acceleratingly and continuously reduced in the same manner as in the case of a positive feed-back control circuit.

After the trace on the S-section from the point a to the point h is finished, the above-stated phenomenon is gradually decelerated as in the case of a negative feedback, and thereafter the trace on the S-section is reversed into the $Q_1$-increasing direction, i.e., from the point h to point a. The trace in this direction is effected also in the same manner as the positive feed-back control circuit.

The above-discussed reciprocal tracing is almost endlessly and continuously repeated during the pump-turbine operation in the S-section. As previously explained, this operation is undesirable since it causes an abnormal hydraulic pressure variation in the hydraulic systems of power station accompanying a heavy water hammer and, ocasionally, a watercolumn separation. It is to be noted that the adverse effects caused during the pump-turbine operation in the S-section are suppressed if the length of the S-section is reduced. For instance, if the wicket gate opening is reduced to obtain the performance curve 2 having the S-section b-e-i of the reduced length, the adverse effects are alleviated.

The pump-turbine operation in the S-section badly affects the pump-turbine torque T also. When the value of $N_1$ is reduced in the S-section, the value of $T_1$ is reduced as shown in FIG. 1B. It is to be noted here again that the points a and h of the performance curve 1 shown in FIG. 1A correspond to the points a′ and h′ of the performance curve 1′ in FIG. 1B. The reduction of the value of $T_1$ means that the pump-turbine torque T is reduced, provided that the pump-turbine effective head H is constant. Further, it is apparent that the reduction in the pump-turbine torque T causes the reduction in the pump-turbine rotation N. When the pump-turbine rotation speed N is reduced, the value of $N_1$ will be correspondingly reduced, which in turn causes a further reduction of $T_1$. Actually, since there is an increase of effective head H during this period as mentioned above, this accelerating tendency is further promoted. Thus, while the S-section of the performance curve 1 is traced in the $Q_1$-reducing direction, the performance curve 1′ is traced from the point a′ to point h′ in the same manner as a positive feed-back control circuit. Further, as the tracing direction on the S-section is reversed, the performance curve 1′ is traced from the point h′ to point a′. Apparently, the abovementioned torque variation is disadvantageous and should be avoided or minimized.

Figure 2A:
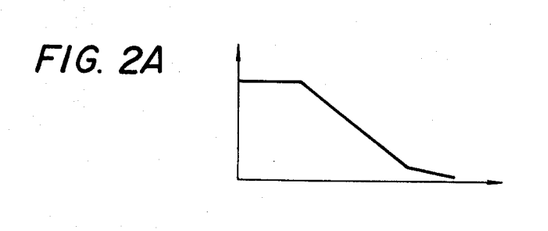
FIGS. 2A, 2B, 2C and 2D are illustrations of conventional method of controlling a pump-turbine.
Figure 2B:
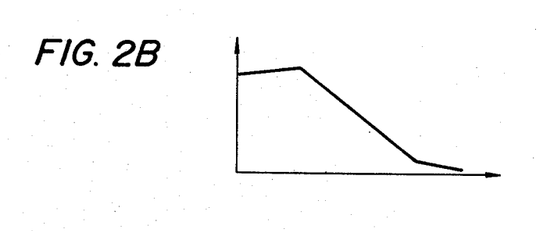

FIGS. 2A to 2D are schematic views showing the prior art methods of controlling the wicket gates upon removal of load from the pump-turbine. In these figures, the prior art methods are schematically illustrated as relationships between the wicket gate opening and the time lapse after the load is removed. The wicket gates are ordinarily controlled by a governor in the pump-turbine to close, when the load is removed, detecting the resultant increased speed. In the method as shown in FIG. 2A, the governor is prevented from closing the wicket gates for a predetermined time period after the removal of the load. More specifically, the wicket gates are maintained to have a constant opening for the predetermined time and thereafter rapidly closed. In the method of FIG. 2B, the wicket gates are first slowly opened and thereafter rapidly closed. These conventional methods, however, have the following problems.

The pump-turbine operation tracing the S-section is not initiated until the speed per unit head ($N_1$) is increased to reach the point a in FIG. 1A, even after the removal of the load. The operation in the S-section is commenced after lapse of a predetermined time period from the removal of load. It is preferable that the wicket gates are rapidly closed during the latter time period, in contrast to the methods of FIGS. 2A and 2B, since the pump-turbine characteristic may be shifted by this rapid closure in the direction to reduce the adverse effects caused by the operation in the S-section. For instance, the pump-turbine characteristic as represented by the curve 1 in FIG. 1A may be shifted by the closure of the wicket gates i.e., the reduction of the wicket gate opening to the characteristic represented by the curve 2. The characteristic curve 2 has the S-section which is smaller in length than the S-section of the characteristic curve 1, so that the adverse effects in question can be reduced by this shift of characteristic. The methods of FIGS. 2A and 2B are not preferred from this stand-point. It is further to be noted that the rapid closure should not be made when the pump-turbine operation is tracing the S-section in the $Q_1$-reducing direction, because by such a rapid closure the $Q_1$ and $N_1$ are undesirably reduced to enhance the bad effect of the S-section. The methods of FIGS. 2A and 2B are dangerous in that the timing of the rapid closure of the wicket gates cannot be distinctively determined. If the rapid closure is made during the pump-turbine operation tracing the S-section in the $Q_1$-increasing direction, these methods will be effective to some extent. If, however, it is made while the S-section is being traced in the $Q_1$-reducing direction, the adverse effects at the S-section will be undesirably multiplied.

Incidentally, as explained before, the pump-turbine operation traces the S-section in an oscillating manner almost endlessly and at a constant period, in the $Q_1$-reducing direction and then in the $Q_1$-increasing direction, once the operation falls within the region of S-section, as long as the wicket gates are maintained open greater than a predetermined opening degree.

This means that the opportunity at which the control is to be made to force the operation out of the S-section comes not only in a specific period immediately after the removal of load, but comes repeatedly thereafter, and it is necessary to exclude the disadvantageous abnormal pressure change in all of these opportunities.

Figure 2C:
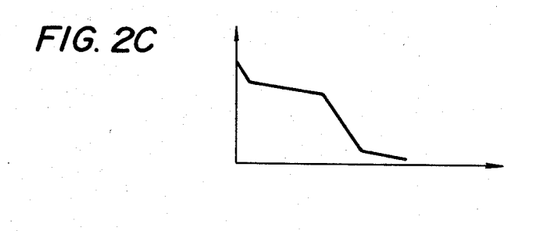

The method as shown in FIG. 2C has been disclosed in Japenese Pat. No. 40902/74. In this method, the wicket gates are first rapidly closed upon sudden removal of load, and then slowly closed during the turbine operation in such an area where flow rate through the pump-turbine is largely reduced with the increase of the pump-turbine rotation, and finally closed rapidly. This method has the defect that the timing of effecting the final rapid closure step is not definitely determined. If this rapid closure is effected during the turbine operation tracing the S-section in the $Q_1$-reducing direction, dangerous situation as described above will be caused. Further, in the case where one hydraulic line extending across one pump-turbine and another hydraulic line extending across another pump-turbine are connected at the upstream end to a common penstock and at the downstream end to a common draft tube, operation of one of the pump-turbines is inconveniently affected by the operation of the other. In such a case, there is some possibility that, even if load has not been removed from one of the pump-turbines, this pump-turbine may operate near the S-section under influence of for example a water hammer caused by the other pump-turbine. If the first rapid closure step in FIG. 2C is performed on the abovementioned one of the pump-turbines which operates near the S-section, there is a fear that the rapid closure of wicket gates will be effected while this pump-turbine operates in the S-section in the $Q_1$-reducing direction.

Further, it is to be pointed out that this disclosure does not suggest at all the timing at which the final rapid closure has to be commenced. This timing is considered critical, because the pump-turbine apparently traces the S-section repeatedly in the $Q_1$-reducing and increasing directions, even in the intermediate period in which the wicket gates are closed slowly.

Figure 2D:
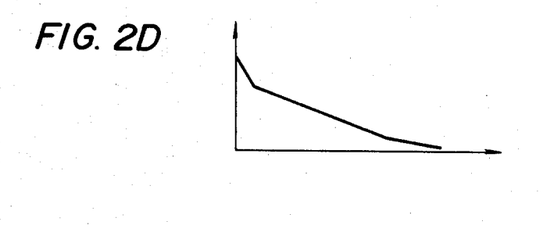

In the method of FIG. 2D, closure of the wicket gates is effected in two steps. This method is also defective in that the timing for the closure step is not definitely determined.

As described above, the prior art methods have the common defect that the timing of effecting the closure of wicket gates is not determined under full consideration of the S-characteristic. In order to avoid the disadvantageous abnormal pressure variation, it is essential to control the wicket gates such that the rapid closure thereof is not effected while the pump-turbine operates tracing the S-section in the $Q_1$-reducing direction. It will also be understood that wicket gates should not be opened while the S-section is being traced in the $Q_1$-increasing direction.

The present inventor conducted an analysis of the S-characteristic given hereinbefore, and found that preferable control results can be obtained by adoption of wicket gates controlling methods, the patent application on which has already been filed in U.S.A. This U.S. patent application is recited in "List of Prior Application References" of the present specification. The abovementioned wicket gates controlling method will be described hereinunder.

First of all, the inventor has found that, in order to prevent the adverse effects in the S-section upon removal or loss of load, it is effective to temporarily open the wicket gates while the closure of the wicket gates are being effected. This temporary opening occurs when the wicket gates have closed to a predetermined opening. Alternatively, the temporary opening may be effected when a predetermined time period has elapsed after the removal or loss of load.

In order to suppress the bad effects caused during the tracing on the S-section in the $Q_1$-reducing direction, it is necessary at least to exclude the rapid closure of the wicket gates during this tracing. It is however more preferable that the opening of the wicket gates is effected upon detection of the turbine operation tracing the S-section in the $Q_1$-reducing direction. As will be understood from FIGS. 1A and 1B, when the pump-turbine operation is effected tracing the S-section, the relationships, $\partial Q_1/\partial N_1 > 0$ and $\partial T_1/\partial N > 0$, are satisfied. In the case where the S section is traced in the $Q_1$-reducing direction, both of the relationships $dN_1/dt < 0$ and $dQ_1/dt < 0$ are satisfied, wherein t represents the time. If the relationship $dQ_1/dt < 0$ is satisfied, the relationship $dP/dt > 0$ also should be satisfied (P indicating the pressure in the penstock). Thus, the detection of the pump-turbine operation tracing the S-section is possible through discrimination of the abovementioned various conditions. More particularly, the pump-turbine operation tracing the S-section in the $Q_1$-reducing direction can be judged by detecting that any one of the following three conditions is satisfied.

(A) $dN_1/dt < 0$, and $dQ_1/dt < 0$;

(B) $dN_1/dt < 0$, and $dP/dt > 0$; and (C) $dT_1/dt < 0$, and $dN_1/dt < 0$.

For a precise detection and judgement of the pump-turbine operation, it is preferable to detect that any one of the above-listed conditions A to C is fully met. From the view point of purpose of the invention, however, the conditions A to C may be replaced by the following conditions A' to C'/

(A') $dN_1/dt <$ a value near zero, and $dQ_1/dt <$ a value near zero;

(B') $dN_1/dt <$ a value near zero, and $dP/dt >$ a value near zero; and (C') $dT_1/dt <$ a value near zero, and $dN_1/dt >$ a value near zero.

Similarly, the hereinafter explained formula, $d^2N/dt^2 < 0$ may be replaced by $d^2N/dt^2 <$ a value near zero.

The inventor has shown that substantially accurate detection can be made even when $dN/dt$, $dQ/dt$ and $dT/dt$ are substituted for $dN_1/dt$, $dQ_1/dt$ and $dT_1/dt$, respectively. This substitution is made on an assumption that the pump-turbine effective head (H) is constant. It will be understood that the detection of the pump-turbine operation tracing the S-section may be made also from the other factors. For example, it may be made be detecting that certain relationships are satisfied among the factors raised in any one of the items given below:

(1) Pump-turbine rotation speed (N), pump-turbine effective head (H), pump-turbine output or pump-turbine torque (T), and opening of wicket gates (Y);

(2) H, pump-turbine output, and Y (the detection from these factors being possible under condition that the pump-turbine is in line operation and it can be expected that N is maintained substantially constant);
(3) Pump-turbine output and if necessary Y (under the same condition as item (2) above);
(4) $\partial T_1/\partial N_1$ and if necessary Y;
(5) $dT/dt$, $dN_1/dt$ and if necessary Y;
(6) $dT/dt$, $dH/dt$ and if necessary Y (under the same condition as item (2) above);
(7) N, H, Q and Y;
(8) H, Q and Y (under the same condition as item (2));
(9) $\partial Q_1/\partial N_1$ and if necessary Y;
(10) $dQ/dt$, $dN_1/dt$ and if necessary Y;
(11) $dQ/dt$, $dH/dt$ and if necessary Y (under the same condition as item (2));
(12) N, H and Y (when it can be expected that pump-turbine output or Q is substantially constant); and
(13) $d^2N/dt^2$, $dN/dt$ and if necessary Y.

As described above, the detection can be made from various factors. However, it is desirable that the detection is made solely from the pump-turbine rotation (N) as in item (13) above, since the variation in the pump-turbine rotation during the pump-turbine operation is continuous and moderate and can be detected accurately and easily. Generally, it is difficult to detect the H, Q and T at a high accuracy. The inventor has found that the judgement on the pump-turbine operation tracing the S-section in the $Q_1$-reducing direction can be made by detecting that both of the two conditions $dN/dt<0$ and $d^2N/dt^2<0$ are simultaneously satisfied.

The disclosure of the prior application has been outlined above.

The applicant has found that the detection on the pumpturbine tracing the S-section can be preferably made by the factors listed in item (13). The detections of N and dN/dt can be made by reliable mechanical switches (speed switches and acceleration switches), while the detection of $d^2N/dt^2$, generally, must be made by means of an electrical circuits, which can not be fully relied on under existing conditions.

DISCLOSURE OF THE INVENTION

It is therefore a major object of the invention to provide a method of controlling a pump-turbine, in which it is judged how the S-section of characteristic curve is traced by the pump-turbine operation point, through a detection of rotation speed (N) or acceleration (dN/dt) of the pump-turbine by highly reliable mechanical switches.

To this end, according to a first aspect of the invention, there is provided a method of controlling a pump-turbine having an S-section in its characteristic curve, in which it is detected, during the pump-turbine operation in the S-section in the S-section in the flow-rate reducing direction, that the rotation speed of the pump turbine has come down below a predetermined level. Upon such a detection, it is judged that the operation point of the pump-turbine operation has commenced to trace the S-section in the flow-rate increasing direction.

According to a second aspect of the invention, there is provided a method of controlling a pump-turbine having an S-section in its characteristic curve, in which it is detected that the rotation speed of the pump turbine has been increased beyond a first predetermined speed due to opening of the circuit breaker or the like reason and, subsequently, that the rotation speed of the pump turbine during tracing of the S-section in the flow-rate reducing direction has come down below a second predetermined speed. Upon detect of both of above two speed conditions, it is judged that the pump-turbine operation point has commenced to trace the S-section in the flow-rate increasing direction.

According to a third aspect of the invention, there is provided a method of controlling a pump-turbine having an S-section in its characteristic curve, wherein it is judged that the operation point is tracing the S-section in the flow-rate reducing direction upon detection of the facts that the acceleration dN/dt of the pump-turbine is materially negative and that the rotation speed N of the pump turbine is greater than a predetermined speed. Then, upon detection of the fact that the rotation speed N of the pump-turbine has come down below the predetermined speed, it is judged that the operation point has began to trace the S-section in the flow-rate increasing direction.

DESCRIPTION OF THE INVENTION

Figure 3:
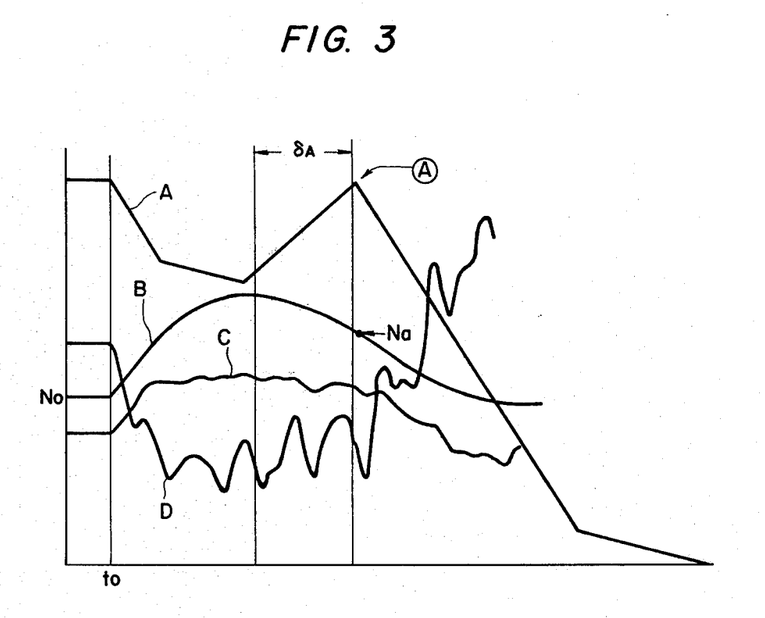
FIG. 3 shows a transient response characteristic at the time of opening of circuit breaker, i.e. at the time of removal of load, exhibited by a pump-turbine under the control by a control method of the invention.

A first embodiment of the invention will be described hereinafter with a specific reference to FIG. 3, showing the transient response characteristic exhibited by a pump-turbine controlled by the method of the invention at the time of opening of the circuit breaker, i.e. at the time of removal of the load. More specifically, in FIG. 3, curves A and B show, respectively, the changes of stroke of wicket-gate driving servo motor and the rotation speed of the pump-turbine, as observed after the opening of the circuit breaker. Also, changes of pressure at the upstream side (penstock) of the pump turbine and at the downstream side (draft tube) of the same are shown at curves C and D, respectively.

Referring to FIG. 3, conditions of $dN/dt<0$ and $d^2N/dt^2<0$ are simultaneously satisfied in the time region $\delta_A$. This means that the operation point of the pump-turbine traces, in this time region $\delta_A$, the S-section in the flow-rate reducing direction.

From an observation of FIG. 3, it is understood that the operation point of the pump-turbine traces the S-section in the flow-rate reducing direction, while the rotation speed N is decreasing but is still high considerably as compared with the rated rotation speed $N_0$. As will be understood from this fact, it may be judged that the operation point of the pump-turbine is tracing the S-section in the flow-rate reducing direction, provided that both of the conditions $dN/dt<0$ and $N>Na$ (Na is selected at a point slightly higher than $N_0$ as shown in FIG. 3) are materially and simultaneously satisfied. It is possible, on the basis of such a judgement, to diminish or alleviate the adverse affect caused during operation in the S-section, by opening the wicket gates as shown by the curve A in FIG. 3, or by reducing the closing speed of the wicket gates.

Figure 4:
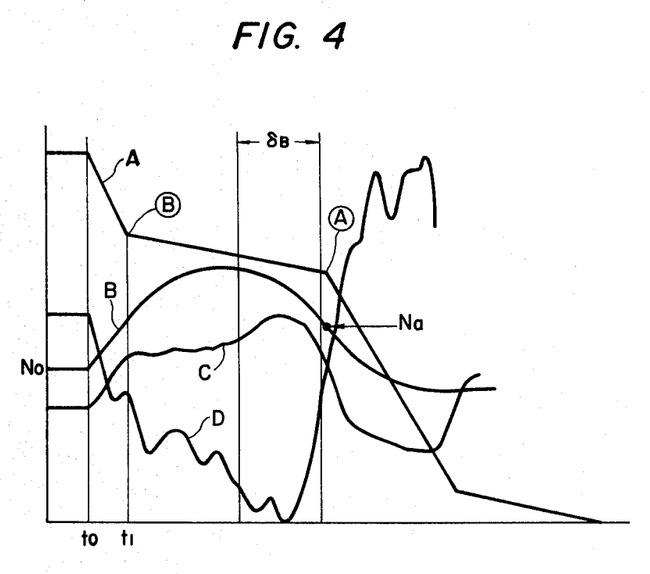
FIG. 4 also shows the transient response characteristic exhibited by a pump-turbine controlled in accordance with the method of the invention at the time of opening of the circuit breaker, i.e. at the time of removal of the load.

FIG. 4 shows another control method in accordance with the invention in which the wicket gates are closed rapidly in a predetermined period ($t_0$ to $t_1$) or until they are closed to a predetermined position after the removal of the load, but the closing speed is reduced thereafter. Then, at the instant at which the S-section has been traced up to its end in the flow-rate reducing direction, i.e. at the instant represented by a point Ⓐ in the curve A showing the change of stroke of the wicket-gate driving servo motor, the rapid closure of the wicket gate is commenced again. In the controlling methods as shown in FIG. 4, it is not necessary to drive the wicket gates in the opening direction, in contrast to the controlling method as illustrated in FIG. 3. It is therefore possible to effect a good control if the point Ⓐ is accurately found out. Upon detect of the point Ⓐ, the final rapid closure of the wicket gates is effected to attenuate the oscillation of the water pressure in a stroke. The point Ⓐ can be determined, in the controlling method as shown in FIG. 4, simply as the point at which the time region $\delta_B$ is ceased, the time region $\delta_B$ being a region in which both of the conditions $dN/dt<0$ and $N>Na$ are satisfied simultaneously.

Figure 5:
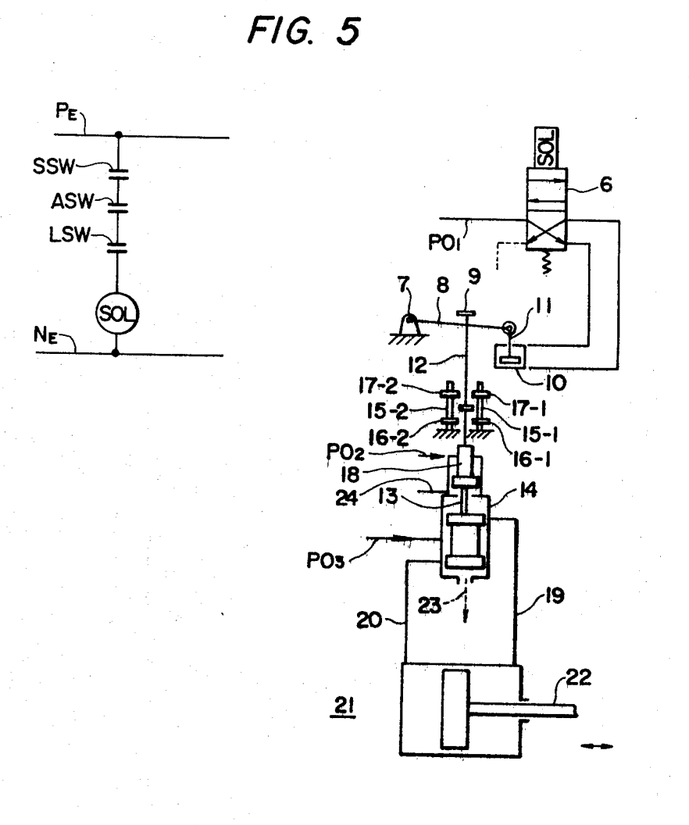
FIG. 5 is a schematic illustration of an apparatus for carrying out the method of the invention.

FIG. 5 shows an apparatus suitable for use in carrying out the controlling method as illustrated in FIG. 3.

More specifically, a solenoid SOL is connected between a positive DC power source $P_E$ and a negative DC power source $N_E$. This solenoid SOL is adapted to be energized only when all of the following three switches have been turned on. The first switch is a mechanical speed detecting switch SSW which is adapted to be turned on condition of $N>Na$, while the second switch is a mechanical acceleration detecting switch adapted to be turned on condition of $dn/dt<0$. At the same time, the third switch is a low power switch LSW which is adapted to be turned on when the generator has lost the load imposed thereon. As the solenoid is energized, it switches an associated spool valve 6, so as to allow a hydraulic pressure $PO_1$ coming from a pressurized oil tank to act on the lower side of a stopper piston 11, thereby to drive the latter upward to the stroke end defined by a cylinder 10. Consequently, a lever 8 is swung around a pivot 7, so as to lift a stopper collar 9 which is connected, through a relay servo motor piston, to the plunger 13 of a main oil pressure distributing valve 14. Although, at this moment, a control hydraulic pressure 24 is relieved in accordance with control by a speed governor (not shown) and a constant pressure $PO_2$ working on the top of the relay servo-motor piston acts to push the plunger 13 down, the upward force by the stopper piston 11 overcomes the downward force and the plunger 13 is forcibly moved upward. Then, the main oil pressure distributing valve 14 allows the hydraulic pressure $PO_3$ coming from the pressurized oil tank to come into a passage 19, while bringing a passage 20 into communication with a draining conduit 23. Consequently, the piston 22 of a wicket-gate driving servo motor 21 is moved in the direction for opening the wicket gates.

Then, as the rotation speed N comes down below the predetermined speed Na, the speed switch SSW is turned off to reset the solenoid SOL, so that the stopper piston 11 is moved downward so as to make the lever 8 completely clear downwardly the stopper collar 9. And again, the wicket-gate driving servo motor 21 is placed solely under the control of a control hydraulic pressure 24 or the command signal from the governor. Since the rotation speed N in this state is still high considerably as compared with the rated speed $N_0$, the speed governor (not shown) acts to bring the control hydraulic pressure 24 into communication with the draining side. Consequently, the relay servo motor piston 18 is fully moved to the lower side. More specifically, the plunger 13 of the main oil pressure distributing valve 14 is lowered to the lower stroke end which has been previously adjusted and limited by means of stop nuts 16-1 and 16-2. Consequently, the application of the hydraulic pressure is reversed to rapidly drive the piston 22 of the wicket-gate driving servo motor in the direction for closing the wicket gates, so as to effect the rapid closure of the wicket gate following the curve A down from the point Ⓐ. In FIG. 5, reference numerals 17-1 and 17-2 denote stop nuts, while numerals 15-1 and 15-2 denote bolts.

Figure 7:
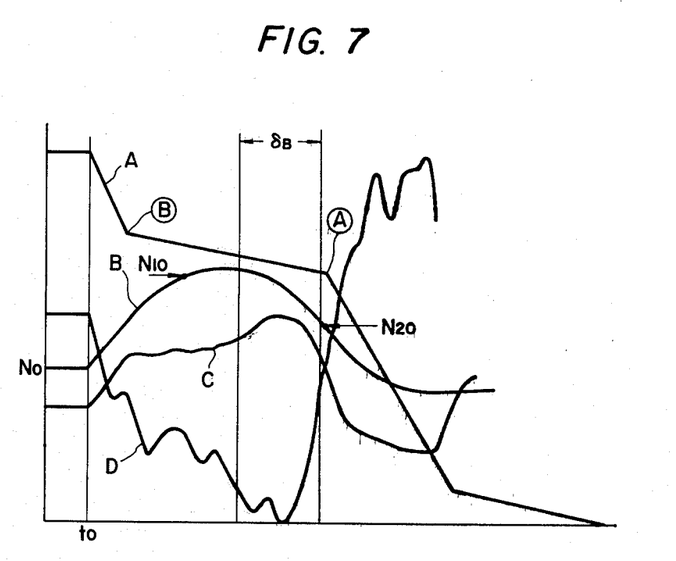
FIG. 7 shows a transient response characteristic exhibited by a pump-turbine controlled in accordance with the method of the invention.

FIG. 7 illustrates a controlling method which is another method of the invention. In FIG. 7, as in FIGS. 3 and 4, changes of stroke of the wicket-gate driving servomotor, rotation speed, water pressure at the upstream side of the pump-turbine (water pressure in the penstock) and the pressure at the downstream side of the pump-turbine (pressure in the draft tube), after the instant $t_0$ at which the load is removed, are shown at curves A, B, C and D, respectively.

As will be seen from FIG. 7, after the removal of the load, the tracing of the S-section up to its one end in the flow-rate reducing direction is completed, when the rotation speed has come down approximately to the level of the rated speed $N_0$, after a temporary increase of the same. Therefore, the method as shown in FIG. 7 makes use of a device for memorizing that the rotation speed has once exceeded a first predetermined speed $N_{10}$ and a device for detecting the rotation speed having come down below a second predetermined speed $N_{20}$. Then, the timing in question (point Ⓐ in FIG. 7) is found out, on condition of operation of the second device for detecting the rotation speed having come down below the speed $N_{20}$ after the operation of the first device for memorizing the rotation speed having exceeded the speed $N_{10}$.

Figure 6:
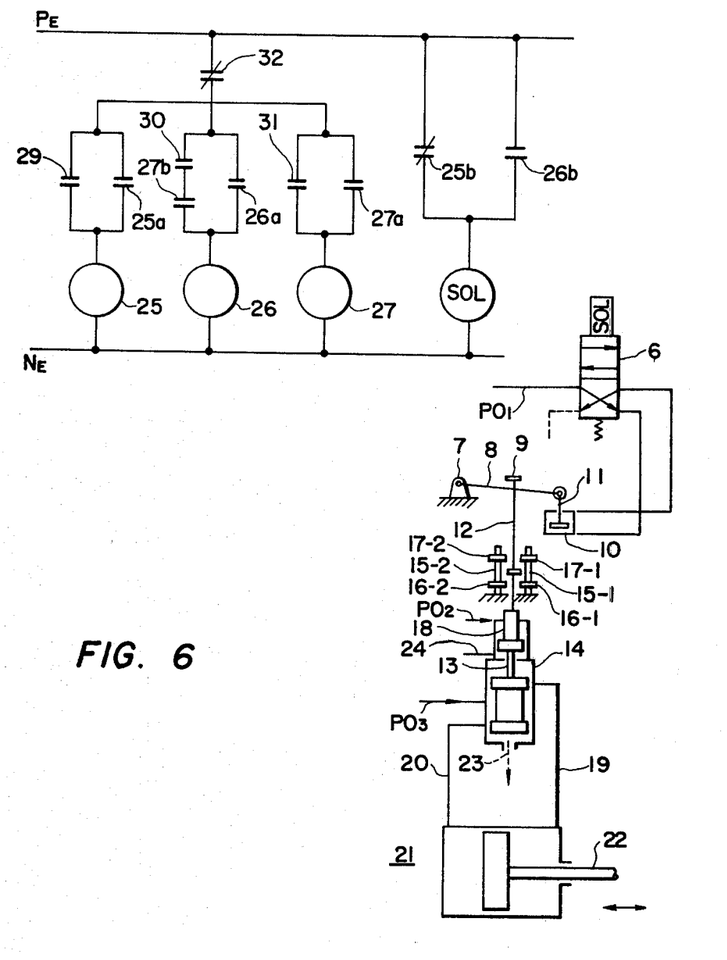
FIG. 6 also is a schematic illustration of an apparatus for carrying out the method of the invention.

FIG. 6 shows an apparatus suitable for use in carrying out the controlling method as illustrated in FIG. 7. In FIG. 6, same reference numerals are used to denote same members or parts as those in FIG. 5.

In operation of this apparatus, as the load is removed by an opening of a circuit breaker, a contact 32 is closed to become conductive. Then, as the opening Y of the wicket gates comes smaller than a predetermined opening Ya as at point Ⓑ in FIG. 7, a contact 29 which is adapted to be closed on condition of $Y<Ya$ is closed, thereby to turn a relay 25 on. The relay 25 keeps the on-state, because it has a self-maintaining circuit 25a, and acts to de-energize the solenoid SOL for driving the valve 6. In this state, a contact 26b has been opened.

Meanwhile, the rotation speed N of the pump-turbine is increased temporarily after the removal of the load. As this rotation speed N is increased beyond the aforementioned first predetermined speed $N_{10}$, a contact 31, which is adapted to be closed on condition of $N > N_{10}$ is turned on. Then, a relay 27, which also has a self-maintaining circuit is energized, so as to memorize the fact that the rotation speed N has been temporarily increased.

Then, as the rotation speed N of the pump turbine is lowered down to a level below the aforementioned second predetermined speed $N_{20}$, a contact 30 which is adapted to be closed on condition of $N < N_{20}$ is turned on. Consequently, an electric current is supplied, through the contact 30 and a contact 27b which has been turned on by the energization of the relay 27, to the relay 26, thereby to energize the latter. As a result, a contact 26b on the circuit of solenoid SOL, which has been turned off, is turned on to allow the energization of the solenoid SOL again.

Namely, the solenoid SOL is kept in the off state over a period from an instant corresponding to the point Ⓑ to an instant corresponding to the point Ⓐ in FIG. 7. During this period, the valve 6 is switched to allow the hydraulic pressure to act on the lower side of the stopper piston 11, so that the latter is moved up to its upper stroke end. Then, the stopper collar 9 which is directly coupled to the plunger 13 of the main oil pressure distributing valve 14 is lifted by the lever 8, so that the plunger 13 is moved forcibly upward, so as to be prevented from moving downward. Consequently, the wicket gates of the pump-turbine are closed at a low speed.

Then, as the rotation speed N of the pump-turbine comes down below the second predetermined speed $N_{20}$, the solenoid SOL is energized again, so that the stopper piston 11 is lowered to make the lever 8 clear the stopper collar 9 downward. Therefore, the wicket-gate driving servomotor is placed under the control of the control hydraulic pressure 24 which is applied to the chamber beneath the relay servomotor piston 18 for driving the plunger 13 of the main oil pressure distributing valve 14.

In this state, since the rotation speed N is considerably high as compared with the rated speed $N_0$, the controlling part of a speed governor (not shown) has put the control hydraulic pressure into communication with the draining side, so as to fully depress the relay servomotor piston 18. Thus, the plunger 13 of the main oil pressure distributing valve is lowered to the lower limit position which has been previously set by the stop nuts 16-1 and 16-2. Consequently, the hydraulic pressure is reversed to the wicket-gate closing direction, and the piston 22 of the servomotor for driving the wicket gates is rapidly moved in the direction for closing the wicket gates. In this apparatus, needless to say, the first and the second predetermined speeds $N_{10}$ and $N_{20}$ are so selected that the first speed $N_{10}$ is greater than the second speed $N_{20}$.

As an application or modification of this controlling method, it is possible to combine the speed detecting switches for detecting the first and the second predetermined speeds with a switch operative in response to the change of opening of the wicket gates, such that the first and the second predetermined speeds are changed in response to the change in level of the load imposed on the pump-turbine. By doing so, it is possible to obtain a higher precision of the pump-turbine control.

As will be understood from the foregoing description, according to the invention, the behavior of the operating point of the pump-turbine during tracing up of the S-section can be exactly detected by a combination of simple mechanical speed detecting switches. It is remarkable that the intended control of the pump-turbine can be made in quite a simple and reliable manner.

INDUSTRIAL UTILITY OF THE INVENTION

The demand for pump-turbines will further increase in the future, in order to provide a balance between the demand and supply of the electric power. Particularly, due to the restriction in the conditions of location, as well as from a view point of capacity, there is an increasing demand for pump-turbines workable at a high head. Under these circumstances, the present invention has an extensive industrial utility, because it provided an effective measure for suppressing and diminishing the adverse or bad effects caused by the S-characteristic which is unavoidable in the pump-turbine operation.

What is claimed is:

1. A method of controlling a pump-turbine having an S-section in its characteristic curve, characterized in that wicket gates of said pump-turbine are controlled upon judging that the operation point of said pump-turbine has commenced to trace said S-section in a flow-rate increasing direction, said judgement being made through a detection of the fact that the rotation speed of said pump-turbine, during the tracing of said S-section up to its end in a flow-rate reducing direction, has come down below a predetermined speed.

2. A method of controlling a pump-turbine having an S-section in its characteristic curve as in claim 1, characterized in that said wicket gates are closed, on condition that said judgement is made, at a rate greater than the rate at which said wicket gates are closed during the tracing up of said S-section by said operation point of said pump-turbine in the flow-rate reducing direction.

3. A method of controlling a pump-turbine having an S-section in its characteristic curve, characterized by comprising the steps of: detecting that the rotation speed of said pump-turbine has increased beyond a predetermined speed which is higher than the rated speed, due to an acceleration of said pump-turbine after a removal or loss of the load; detecting that the rotation speed of said pump-turbine which has commenced to trace up said S-section in a flow-rate reducing direction within a short time after detection of said predetermined speed has come down below a preset speed; judging at least from the second of said foregoing two detections that the operation point of said pump-turbine has commenced to trace down said S-section in a flow-rate increasing direction; and then controlling the wicket gates of said pump-turbine upon said judgement having been made.

4. A method of controlling a pump-turbine having an S-section in its characteristic curve, characterized in that the wicket gates of said pump-turbine are controlled upon judging that the operation point of said pump-turbine is tracing said S-section in the flow-rate reducing direction, said judgement being made through detections of the facts that the acceleration dN/dt of said pump-turbine is negative and that the rotation speed N of said pump-turbine has exceeded a predetermined speed.

5. A method of controlling a pump-turbine having an S-section in its characteristic curve as claimed in claim 4, comprising the subsequent step of determining that said operation point of said pump-turbine has commenced to trace said S-section in the flow-rate increasing direction, through a detection of the fact that said rotation speed of said pump-turbine has returned below said predetermined speed, and adjusting the manner in which said wicket gates are controlled in response thereto.

6. A method of controlling a pump-turbine having an S-section in its characteristic curve as claimed in claim 1, 2, 3, 4 or 5, wherein said predetermined speed at which tracing of the S-section in the flow-rate increasing direction has commenced is changed in response to a change in the level of load imposed on said pump-turbine.

7. A method according to claim 3, wherein a rapid closing of said wicket gates is commenced when said judgement has been made.

8. A method according to claim 3 or 7, wherein said preset speed is independently adjustable and lower relative to said predetermined speed and said judgement is made on the basis of both said detections.

9. A method according to claim 3, wherein said judgement is made on the basis of a detection that pump acceleration dn/dt is materially negative in addition to said second detection.

10. A method according to claim 9, wherein, between said acceleration detection and the detection of said rotation speed having come down below said preset speed, said wicket gates are opened.

11. A method according to claim 9, wherein, between said acceleration detection and the detection of said rotation speed having come down below said preset speed, a closing speed of said wicket gates is reduced.

12. A method according to claim 9, wherein said predetermined and preset speeds are the same, said detecting of the rotation speed of the pump-turbine having increased beyond said predetermined speed being performed by switching of a speed switch and the detecting of said rotation speed having come down below said preset speed being performed by resetting of said speed switch.

13. A method according to claim 9 or 12, wherein the acceleration detection is performed by an acceleration detecting switch.

14. A method according to claim 1 or 11 or 12, wherein a rapid closing of said wicket gates is commenced when said judgement has been made.

* * * * *